United States Patent [19]

Ahonen et al.

[11] Patent Number: 4,865,451
[45] Date of Patent: Sep. 12, 1989

[54] SILICON SUBSTRATE MIRROR ASSEMBLY FOR LASERS

[76] Inventors: Robert G. Ahonen, 120 205th La. NW, Cedar, Minn. 55011; John Malenick, 2035 Innsbruck Pkwy., Minneapolis, Minn. 55421

[21] Appl. No.: 237,627

[22] Filed: Aug. 26, 1988

Related U.S. Application Data

[63] Continuation of Ser. No. 944,901, Dec. 22, 1986, abandoned.

[51] Int. Cl.$^4$ .............................................. G01C 19/64
[52] U.S. Cl. .................................... 356/350; 372/107; 350/600
[58] Field of Search ................. 356/350; 372/107; 350/600, 609, 641

[56] References Cited

U.S. PATENT DOCUMENTS

| | | |
|---|---|---|
| 2,464,141 | 3/1949 | Meyer et al. . |
| 3,930,731 | 1/1976 | Andringa ........................... 356/350 |
| 4,190,364 | 2/1980 | Ljung et al. ....................... 356/350 |
| 4,203,080 | 5/1980 | Wright et al. ...................... 372/107 |
| 4,271,397 | 6/1981 | Stiles et al. ......................... 356/350 |
| 4,281,930 | 8/1981 | Hutchings .......................... 356/350 |
| 4,315,991 | 2/1982 | Hagy et al. . |
| 4,388,344 | 6/1983 | Shuskus et al. . |
| 4,444,467 | 4/1984 | Shuskus et al. . |
| 4,451,119 | 5/1984 | Meyers et al. . |
| 4,519,708 | 5/1985 | Perlmutter et al. . |
| 4,525,028 | 6/1985 | Dorchner ........................... 356/350 |
| 4,623,228 | 11/1986 | Galasso et al. . |
| 4,676,643 | 6/1987 | Vescial . |

FOREIGN PATENT DOCUMENTS 2059143  4/1981  United Kingdom .

OTHER PUBLICATIONS

"Hybrid Metal Mesh-Dielectric Mirrors for Optically Pumpted Far Infrared Lasers", E. J. Danielewicz and P. D. Coleman, Applied Optics, vol. 15, No. 3, pp. 761-767, Mar. 1976.

"SiC, A New Material for Mirrors", W. J. Choyke, R. F. Farich and R. A. Hoffman, Applied Optics, vol. 15, No. 9, pp. 2006-2007, Sep. 1976.

Primary Examiner—Vincent P. McGraw
Assistant Examiner—S. A. Turner
Attorney, Agent, or Firm—Robert A. Pajak

[57] ABSTRACT

Discloses a mirror chip and mirror assembly for ring laser angular rate sensors. A mirror assembly utilizes a silicon substrate upon which is deposited in mirror material. The silicon substrate is then affixed to a second substrate by a thermally sealable bonding agent.

11 Claims, 1 Drawing Sheet

SILICON SUBSTRATE MIRROR ASSEMBLY FOR LASERS

This application is a continuation, of application Ser. No. 944,901, filed Dec. 22, 1986, now abandoned.

BACKGROUND OF THE INVENTION

This invention relates to a novel construction for ring laser angular rates sensors and more particularly to a construction of a mirror assembly for such sensors which is less costly to manufacture than prior art constructions.

After years of development, ring laser angular rate sensors, commonly referred to as ring laser gyros, have become commercially successful products. Today, most commercial ring laser angular rate sensors use a mechanically and thermally stable block construction and mechanical dither concepts taught in U.S. Pat. No. 3,390,606, issued to T. Podgorski, and U.S. Pat. Nos. 3,467,472 and 3,373,650, both of which were issued to J. Killpatrick, these patent being incorporated by reference herein.

These prior art ring laser angular rate sensors have proven highly satisfactory in operation. These prior art ring laser angular rate sensors, however, are costly to manufacture.

A key element of a ring laser angular sensor is the mirror assembly. The mirror assemblies, using prior art construction techniques, include a substrate which is usually of a material which is the same as that chosen for the laser block which contains a cavity filled with gas. The block and mirror substrates may be, for example, Cervit, Zerodur, Fused Silica, BK-7 glass, etc.

The mirror assembly substrates of the prior art have at least one highly polished surface. Multi-layer dielectric coatings are deposited directly on the highly polished substrate surface to form a mirror. Secondly, the highly polished substrate can be joined with matching highly polished block in order to fix the mirror substrate assembly to the block by, what is referred to as, an optical contact technique. That is, the surfaces are so highly polished that when the substrate and block are pressed together, the substrate is fixed to the block without bonding agents.

As is well known to those skilled in the art, the mirrors are the critical components of a ring laser angular rate sensor. This is so since a poor mirror does not achieve superior reflectivity required by a laser angular rate sensor. Reflectivity of the mirror is normally desired to be 99.9%. Poor reflectivity results in scattering of the laser beams in the ring laser which in turn causes a degradation in rate sensor performance. In order to achieve superior reflectivity, the substrates require extreme measures to achieve an ultra-high polished surface before the coatings are deposited thereon. To achieve an ultra-high polished mirror substrate surface usually requires several days of abrasive polishing.

After the step of ultra-high polishing of the mirror substrate's surface, the multi-layer coatings are deposited. The final step in the mirror assembly process is quality check. If the mirror assemblies fail the quality check, the polishing step and deposition step must be repeated. For these reasons, the mirror assemblies are very costly to produce.

SUMMARY OF THE INVENTION

An object of this invention is the provision of a novel construction for a ring laser mirror assembly which permits it to be inexpensively manufactured. Briefly, this invention contemplates a silicon wafer or chip which is secured to a mirror substrate by a thin film of a thermally sealable bonding agent. A mirror coating is deposited on the chip before or after the chip has been secured to the substrate.

DETAILED DESCRIPTION OF THE INVENTION

Figure 1:
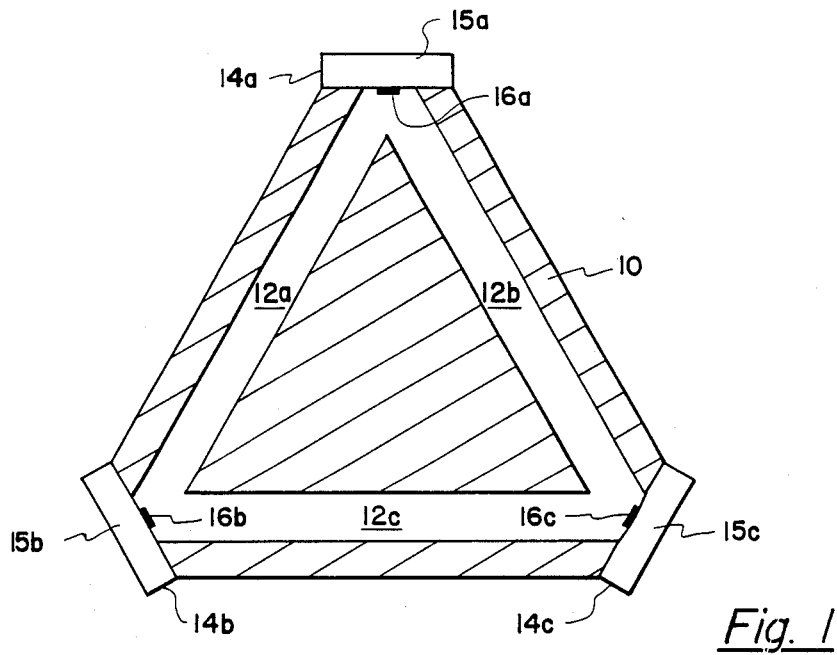
FIG. 1 is a plan view of a ring laser angular rate sensor.

FIG. 1 illustrates the components which comprise a ring laser angular rate sensor as specifically described by the aforementioned U.S. patents. Briefly, a mechanically and thermally stable block 10 has tunnels 12a, 12b, and 12c bored therethrough to form a triangular lasing cavity. Mirror assemblies 14a, 14b, and 14c each include a mirror substrate 15a, 15b, and 15c, respectively, and mirror coatings 16a, 16b, and 16c, respectively. Each of the mirror assembly substrates 15 are secured to the block 10 by a variety of techniques including optical contact, indium seal, epoxy, and thermally formed seals (frit seal). In FIG. 1, substrate 15c is shown to have a large radius of curvature surface which includes mirror coating 16c which follows the contour of substrate 15c.

Figure 2:
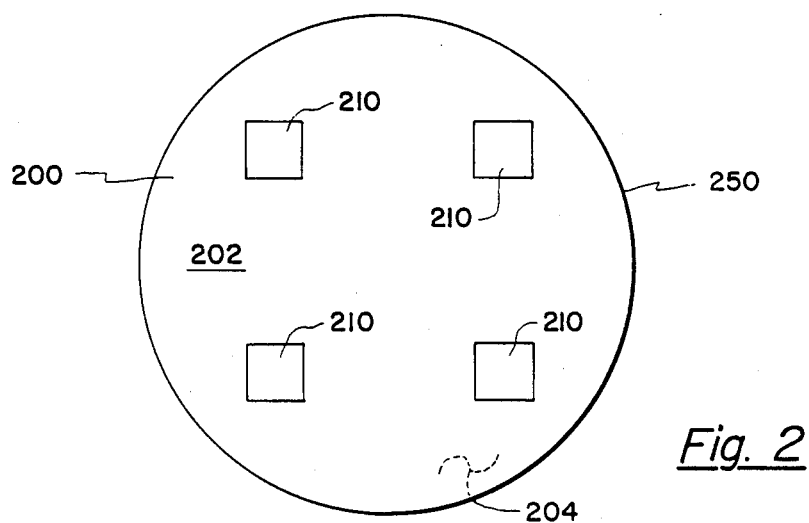
FIG. 2 illustrates a polished silicon wafer having multi-layer dielectric patterns deposited thereon.
Figure 3:
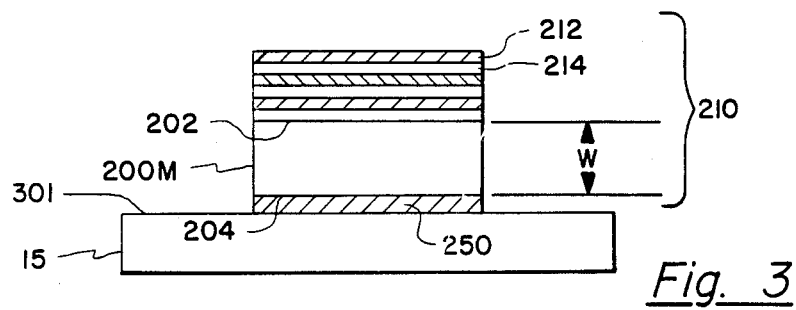
FIG. 3 illustrates a side view of a mirror chip.

In the present invention, the mirror coatings are replaced by mirror chips which are secured to the mirror substrates 15 by a thermally sealable bonding agent. Illustrated in FIGS. 2 and 3 is a mirror chip in accordance with the present invention. FIG. 2 illustrates mirror chip substrate comprised of a very thin silicon wafer 200 having a finished thickness "W" in the order of 0.003-0.005 inches after polishing. The back side of silicon wafer 200 identified as surface 204 is polished sufficient for receiving a thin film of a thermally sealable bonding agent 250 as will subsequently be described. Preferably after the bonding agent is applied to wafer 200, shown surface 202, thereof, is ultra-high polished for receiving mirror coatings thereon as will be described.

In the preferred embodiment, the thin film bonding agent 250 is comprised of a thin film of glass first deposited on surface 204 of mirror chip substrate 200 by vacuum-sputtered deposition. The glass or other bonding agent may also be deposited on substrate 200 by other suitable processes in order to provide a very thin and uniform film of the thermally sealable bonding agent 250. In one method of deposition, a glass is selected as a target in a vacuum chamber and sputtered onto mirror chip substrate surface 204 used as the workpiece. Examples of glasses which may be used, among others, are low thermal expansion glass such as Corning Glass No. 7723 and No. 7594 which are lead oxide glasses, or No. 0211 which is a borosilicate glass. The layer thickness of the vacuum-sputtered glass could range from less than one micron thick to about 10 microns for a satisfactory thermally sealable bonding agent. The layer thickness should be kept as low as possible to prevent deleterious effects caused by any mismatch in the thermal coefficients of the materials to be bonded together. The glass or other thermally sealable bonding agent is preferably chosen to have a melting point temperature to be as low as possible. Too high of a melting point termperature may result in damage to the mirror materials during the bonding process.

Preferably, the thermally sealable bonding agent should have thermal characteristics which closely match the material of the wafer selected. In the present invention, Corning Glass No. 7723 was found to reasonably match the thermal characteristics of a silicon wafer. Of course, the greater the thickness, the greater will be the tendency to have thermal mismatch effects as will be discussed below.

After the bonding agent has been applied to the surface 204 of wafer 200 and surface 202 has been highly polished as aforesaid, a highly reflective multi-layer dielectric coating, for example, alternate layers 212 and 214 of silicon dioxide and zirconium dioxide, respectively, are deposited on surface 202. These layers being the mirror material which form the mirror. Deposition of the dielectric coatings on the silicon wafer may be accomplished by any of the well known semiconductor or other processing techniques. Further, the deposition of the multilayer dielectric coatings may be accomplished by other techniques including ion beam, e-beam, or the like. However, standard semiconductor deposition techniques are believed to achieve the lowest cost.

It should be noted that the mirror chip substrate may alternatively be comprised of other materials such as thin wafers of fused quartz, Zerodur, Cervit, and any other material which will serve the intended function. The mirror chip need only be capable of allowing a mirror material to be deposited thereon. Further, the mirror chip substrate may be comprised of a wafer material which may be polished to provide the mirror function itself. However, the state-of-the-art of silicon polishing makes a silicon wafer the preferred choice since silicon polishing may be in the order of ten times greater than that of other materials such as fused quartz, or the like.

Subsequent to the polishing of the wafer and deposition of the mirror coating on the wafer, disc shaped mirror chips 210, as illustrated in FIG. 3, are cut out from wafer 200 by a variety of techniques including laser trimming or etching. FIGS. 2 and 3 show the mirror chips as rectangular shaped, however any mirror chip shape is within the scope of the present invention. The resulting mirror chips 210 include a wafer portion 200m which forms the mirror chip substrate, the bonding agent 250 on surface 204, and the mirror coatings on surface 202.

In order to provide low cost mirror chips, silicon wafer 200 may be in the order of 3 to 4 inches in diameter and the mirror chips are in the order of 0.04 square inches. Thus, a single wafer can produce many mirror chips on a single wafer. Many chips can be processed through each of the deposition process steps and include quality checks.

In the present invention, mirror chip 210 is bonded to mirror assembly substrate 15 by a thermal sealinq process. End surface 301 of mirror assembly substrate 15 should be suitably polished for bonding chip 210 thereto. The degree of polishing required being much less than that required for optical contact. Substrate 15 and chip 210 including bonding agent 250 are heated together in a furnace to a temperature which causes the thermally sealable bonding agent film to fuse the mirror chip substrate 200m and substrate 15 together. With glass as the bonding agent, the temperature, of course, depends on the lower fusing temperature or softening-point of the glass selected. Successful results with glass have been obtained at furnace temperatures in the range of 450° C. to 800° C.

Sputtered glass films containing lead oxide or other substances that couple well with microwaves may also be utilized as the bonding agent. In these circumstances, heating of the the leaded glass and the mating surfaces of the substrates may be accomplished by microwave heating, and is within the scope of the present invention.

It should be understood by those skilled in the art that the thermal characteristics of all of the materials utilized by the mirror assembly should be suitably matched and capable of withstanding the heating temperatures during the bonding or fusing process. Unmatched characteristics can cause fracturing and the like. It is paramount that the choice of dielectric coatings for the mirror function must be such to yield a superior mirror for laser angular rate sensors. Alternating layers of zirconium dioxide and silicon dioxide as a mirror coating may be an acceptable material to withstand the bonding temperatures and still provide a mirror coating with good characteristics suitable for laser angular rate sensors.

It should be understood that the thin film bonding agent should be as thin as possible to prevent degradation of the bond between the materials selected for the mirror chip substrate and the mirror assembly substrate.

It should be understood that the order of the process steps, as illustrated in preferred embodiments above, may be altered without departing from the true spirit and scope of the present invention. For example, alternatively, the thermal bonding agent may be applied to surface 301 of mirror assembly substrate 15 instead of the wafer surface 204, or applied to both surfaces before bonding the surfaces together by the heating process. Further, alternatively, the mirror chip could be polished and bonded to to the mirror assembly substrate 15 before the mirror coatings or dielectric materials are deposited upon the polished chip surface. The wafer itself may be polished before or after the thermal bonding agent is applied therto. As just indicated, there are many alternate ways of constructing the mirror assembly in accordance with the present invention.

The mirror assembly in accordance with the present invention provides a low cost construction and reliable mirror assembly to satisfy the object of the present invention.

Those skilled in the art will recognize that the preferred embodiment of the present invention has been disclosed herein and that the embodiment may be altered and modified without departing from the true spirit and scope of the invention as defined in the accompanying claims. Particularly, one or more layers of material which provide the mirror function is all that is needed to be within the scope of the present invention.

The embodiments of the invention in which an exclusive property or right is claimed are defined as follows:

1. A mirror assembly comprising:
    a mirror chip including a silicon substrate having first and second oppositely facing surfaces, said first surface having at least one mirror material deposited thereon to form a mirror;
    mirror assembly substrate having a first surface for supporting said silicon substrate; and a thin glass film deposited by a selected thin film deposition process on a selected one of said first surface of said mirror assembly substrate and said second surface of said silicon substrate, said thin glass film bonding together and in between said first surface of said mirror assembly substrate and said second surface of said silicon substrate.

2. The mirror assembly of claim 1 wherein said mirror material includes a plurality of alternating layers of at least two dielectric materials deposited on said first surface of said silicon substrate to form a highly reflective mirror.

3. The mirror assembly of claim 1 wherein said mirror material is comprised of alternating layers of silicon dioxide and titanium dioxide.

4. The mirror assembly of claim 1 wherein said mirror material is comprised of alternating layers of silicon dioxide and zirconium dioxide.

5. The mirror assembly of claim 1 wherein said thin glass film is a vacuum sputtered glass film deposited on said second surface of said silicon substrate.

6. A ring laser angular rate sensor comprising:
a mechanically thermally stable block having a plurality of interconnecting tunnels; and
a mirror assembly having,
    a mirror chip including a silicon substrate having first and second oppositely facing surfaces, said first surface having at least one mirror material deposited thereon to form a mirror,
    a mirror assembly substrate having a first surface for supporting said silicon substrate, said mirror assembly substrate including a second surface for affixing said mirror assembly substrate to said block, and
    a thin glass film deposited by a selected thin film deposition process on a selected one of said first surface of said mirror assembly substrate and said second surface of said silicon substrate, said thin glass film bonding together and in between said first surface of mirror assembly substrate and said second surface of said silicon substrate; and
    said mirror assembly substrate is positioned on said block to that said mirror intercepts one of said interconnecting tunnels.

7. The mirror assembly of claim 6 wherein said mirror material includes alternating layers of dielectric materials.

8. The mirror assembly of claim 6 wherein said mirror material includes a plurality of alternating layers of at least two dielectric materials deposited on said first surface of said silicon substrate to form a highly reflective mirror.

9. The mirror assembly of claim 8 wherein said mirror material is comprised of alternating layers of silicon dioxide and titanium dioxide.

10. The mirror assembly of claim 8 wherein said mirror material is comprised of alternating layers of silicon dioxide and zirconium dioxide.

11. The mirror assembly of claim 6 wherein said bonding agent is film of glass.

* * * * *